US010933828B2

(12) United States Patent
Nagasawa et al.

(10) Patent No.: US 10,933,828 B2
(45) Date of Patent: Mar. 2, 2021

(54) AIRBAG DEVICE

(71) Applicant: SUBARU CORPORATION, Tokyo (JP)

(72) Inventors: Isamu Nagasawa, Tokyo (JP); Hayato Aiuchi, Tokyo (JP); Hiroshi Yoneyama, Tokyo (JP); Manami Aikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 125 days.

(21) Appl. No.: 16/411,281

(22) Filed: May 14, 2019

(65) Prior Publication Data
US 2020/0101918 A1 Apr. 2, 2020

(30) Foreign Application Priority Data

Sep. 28, 2018 (JP) .............................. JP2018-183846

(51) Int. Cl.
*B60R 21/0136* (2006.01)
*B60R 21/213* (2011.01)
*B60R 21/36* (2011.01)

(52) U.S. Cl.
CPC ........ *B60R 21/0136* (2013.01); *B60R 21/213* (2013.01); *B60R 21/36* (2013.01)

(58) Field of Classification Search
CPC ... B60R 21/0136; B60R 21/213; B60R 21/36; B60R 21/34; B60R 21/26; B60R 21/261; B60R 2021/2612
USPC ..................................................... 280/730.2
See application file for complete search history.

(56) References Cited

U.S. PATENT DOCUMENTS

| 2010/0252350 | A1* | 10/2010 | Hayashi | .................. | B60R 21/36 180/274 |
| 2010/0252351 | A1* | 10/2010 | Okamoto | ................ | B60R 21/36 180/274 |
| 2013/0119644 | A1* | 5/2013 | Rick | ....................... | B60R 21/36 280/728.2 |
| 2016/0288764 | A1* | 10/2016 | Suzuki | .................... | B60R 21/36 |

(Continued)

FOREIGN PATENT DOCUMENTS

| EP | 2050635 A2 * | 4/2009 | ............. B60R 21/36 |
| EP | 2105358 A1 * | 9/2009 | ........... B60R 21/233 |
| JP | 2003306101 A * | 10/2003 | |

(Continued)

*Primary Examiner* — James A English
*Assistant Examiner* — Kurtis Nielson
(74) *Attorney, Agent, or Firm* — Smith, Gambrell & Russell, LLP (57) ABSTRACT

An airbag device includes an airbag configured to deploy in front of a front pillar of a vehicle; an inflator configured to supply expansion gas to expand the airbag; and a gas tube provided in the airbag and configured to supply the expansion gas from the inflator. The front pillar includes a storage formed inside the front pillar in a vehicle compartment and configured to store at least the airbag, and a partition configured to separate between an inside and an outside of the vehicle component. A partition hole is open in the partition. Before the expansion gas is supplied from the inflator, part of the airbag and an injection port configured to inject the expansion gas from the gas tube are disposed in front of or in the partition hole, and the injection port is disposed facing the outside of the vehicle compartment.

19 Claims, 9 Drawing Sheets

(56) References Cited

U.S. PATENT DOCUMENTS

2019/0071050 A1 * 3/2019 Farooq .................. B60R 21/233

FOREIGN PATENT DOCUMENTS

| JP | 2008285109 A | * | 11/2008 | ............. | B60R 21/36 |
| JP | 2008285110 A | * | 11/2008 | ............. | B60R 21/36 |
| JP | 2009208761 A | * | 9/2009 | ............. | B60R 21/36 |
| JP | 2010-235007 A | | 10/2010 | | |

* cited by examiner

AIRBAG DEVICE

CROSS-REFERENCE TO RELATED APPLICATIONS

The present application claims priority from Japanese Patent Application No. 2018-183846 filed on Sep. 28, 2018, the entire contents of which are hereby incorporated by reference.

BACKGROUND

The disclosure relates to airbag devices each including an airbag configured to be deployed in front of a front pillar of a vehicle.

There has been known airbag devices including airbags configured to be deployed and expanded in front of front pillars of a vehicle to protect a person such as a pedestrian in a collision, which is disclosed, for example, in Japanese Unexamined Patent Application Publication (JP-A) No. 2010-235007.

SUMMARY

An aspect of the disclosure provides an airbag device including an airbag, an inflator, and a gas tube. The airbag is configured to deploy in front of a front pillar of a vehicle. The inflator is configured to supply expansion gas to expand the airbag. The gas tube is provided in the airbag and configured to supply the expansion gas from the inflator. The front pillar includes a storage formed inside the front pillar in a vehicle compartment and configured to store at least the airbag, and a partition configured to separate between an inside and an outside of the vehicle component. A partition hole is open in the partition. Before the expansion gas is supplied from the inflator, part of the airbag and an injection port configured to inject the expansion gas from the gas tube are disposed in front of or in the partition hole, and the injection port is disposed facing the outside of the vehicle compartment. When the expansion gas is supplied from the inflator, the airbag disposed in the vehicle compartment moves outside the vehicle compartment via the partition hole, and deploys and expands in front of the front pillar.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

The airbag device disclosed in JP-A No. 2010-235007 is stored in a storage space out of the vehicle compartment. Therefore, it is difficult to increase the space to store the airbag device outside the vehicle compartment, without decreasing the strength of the body structure, and also difficult to expand the cover range of the airbag for the front pillar.

In particular, in a case where the person colliding with the vehicle is a cyclist riding a bicycle, the center of gravity of the cyclist is high and the velocity of the vehicle relative to the bicycle is increased, and therefore the cyclist hit by the vehicle goes flying in an uncertain trajectory for a long distance. In addition, the cyclist collides with a front pillar in varied directions at varied velocities, and therefore it has been demanded to expand the cover range of the airbag for the front pillar. For example, in the case of a pedestrian, the trajectory of the flying pedestrian is predictable in such a way that fist, the lower body of the pedestrian is hit by a bumper of the vehicle, and then the pedestrian collides with a hood or a cowl (second collision) followed by a windshield or a front pillar (third collision). Meanwhile, in the case of a cyclist, the trajectory of the flying cyclist is predictable in such a way that the cyclist directly collides with the upper end of the windshield or front pillar without the second collision with the hood. As described above, in consideration of the case where a person to be protected is a cyclist, it has been demanded to expand the cover range of the airbag for the front pillar.

Moreover, when the cover range of the airbag for the front pillar is expanded, there is a demand to deploy the airbag in a stable manner.

It is desirable to provide airbag devices for the front pillars of a vehicle configured to deploy airbags in a stable manner, while increasing the volume of the airbags and expanding the cover range of the airbags for the front pillars of the vehicle.

Embodiment 1

The airbag devices according to the disclosure are configured to cover the fronts of the front pillars in order to protect a person colliding with a vehicle. Hereinafter, Embodiment 1 of the disclosure will be described with reference to FIG. 1 to FIGS. 5A-5B.

Figure 1:
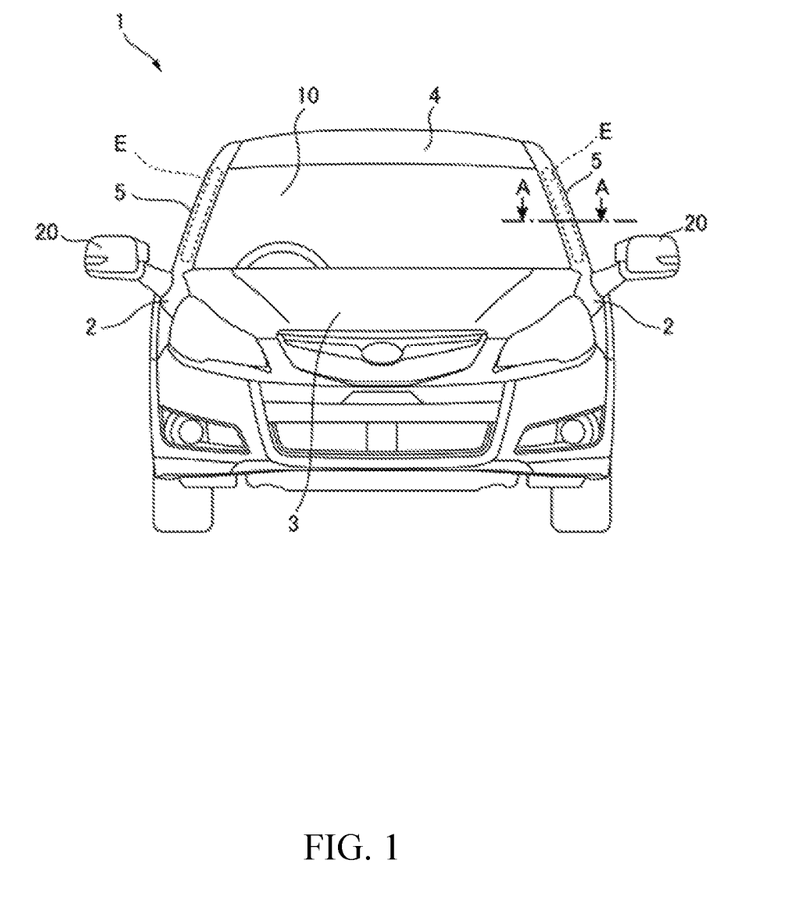
FIG. 1 is a front view illustrating a vehicle equipped with airbag devices according to Embodiment 1 of the disclosure.
Figure 2:
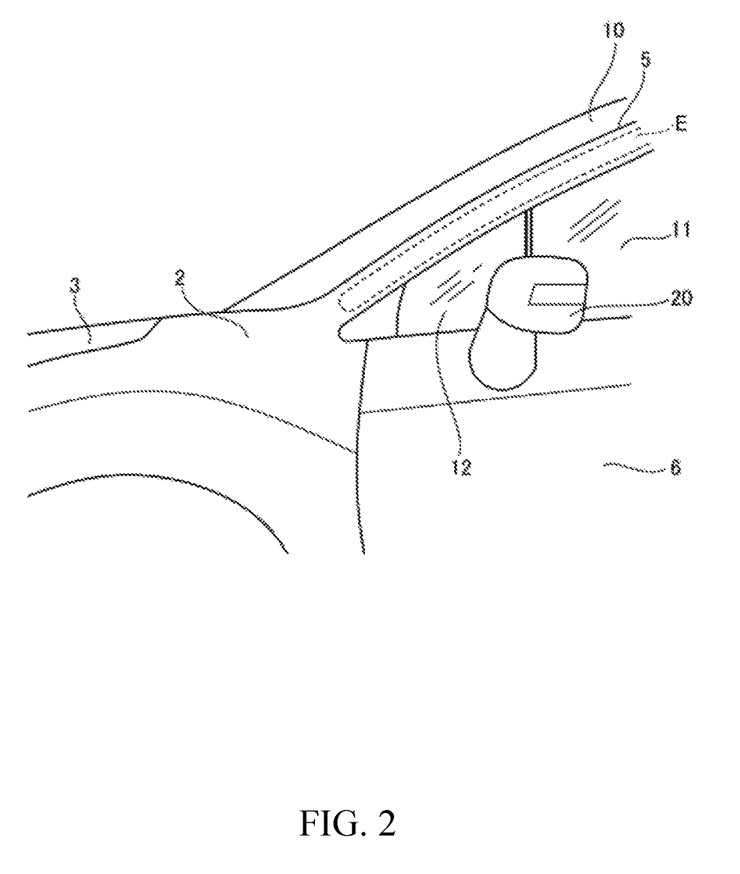
FIG. 2 is a side view illustrating the vehicle equipped with the airbag device according to Embodiment 1.

FIG. 1 is a front view illustrating a vehicle 1 equipped with airbag devices E according to Embodiment 1. FIG. 2 is a side view illustrating the vehicle 1 equipped with the airbag device E according to Embodiment 1. As illustrated in FIG. 1, the airbag devices E according to Embodiment 1 are disposed symmetrically with respect to the vehicle 1. Hereinafter, one of the airbag devices E will be mainly described, and the detailed description of the other will be omitted.

As illustrated in FIG. 1 and FIG. 2, the vehicle 1 equipped with the airbag device E has a bodyshell including front fenders 2, a front hood 3, a roof 4 forming the top face of a vehicle compartment, front pillars 5, side doors 6 forming the side surfaces of the vehicle compartment and so forth.

The front pillars 5 fix the side edges of a windshield 10 forming the front surface of the vehicle compartment, and the roof 4 is supported by the upper portions of the front pillars 5. Here, the roof 4 is supported not only by the front pillars 5 disposed in the front side of the vehicle compartment, but also by center pillars disposed in the center side of the vehicle compartment (not shown), and rear pillars disposed in the rear side of the vehicle compartment (not shown).

Each of the side doors 6 has a side window 11 capable of moving up and down, and a triangle window 12 incapable of moving up and down. A door mirror 20 is attached to the upper part of the side door 6.

In addition, the side window 11 and the triangle window 12 are made of transparent glass, but this is by no means limiting. The side window 11 and the triangle window 12 may be made of transparent resin with rigidity such as polycarbonate.

The airbag E is stored in a closed space in the front pillar 5 inside the vehicle compartment.

Figure 3:
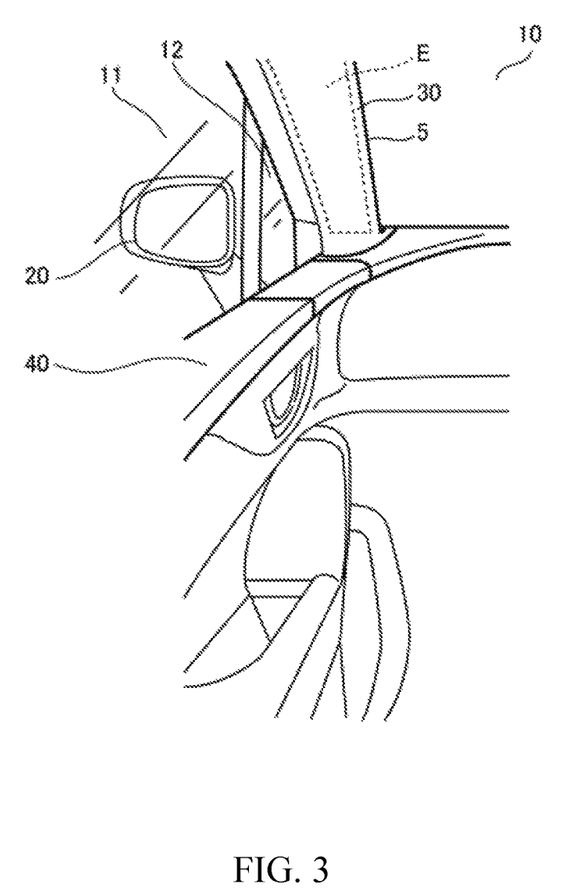
FIG. 3 is an enlarged view illustrating the periphery of a front pillar viewed from the inside of the vehicle compartment of the vehicle equipped with the airbag device according to Embodiment 1.

FIG. 3 is an enlarged view illustrating the periphery of the front pillar 5 viewed from the inside of the vehicle compartment of the vehicle 1 equipped with the airbag device E.

As illustrated in FIG. 3, a pillar trim 30 made of resin is mounted to the front pillar 5 inside the vehicle compartment, and a door trim 40 is mounted to the side door 6 inside the vehicle compartment.

Figure 4A:
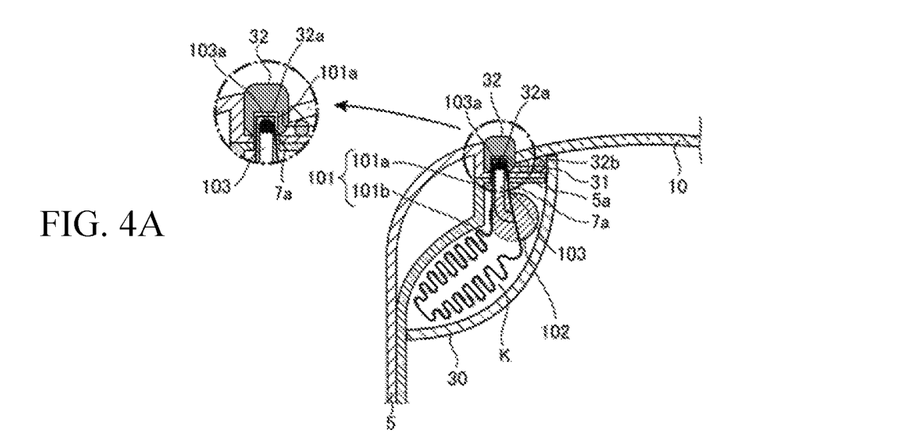
FIGS. 4A-4B are cross-sectional views schematically illustrating the front pillar according to Embodiment 1, taken along line A-A of FIG. 1.
Figure 4B:
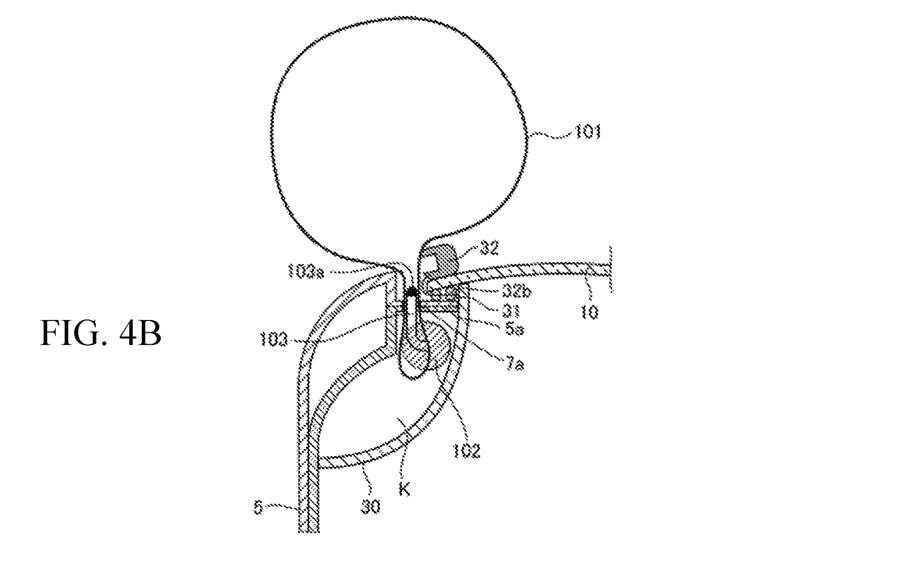

FIGS. 4A-4B are cross-sectional views schematically illustrating the periphery of the front pillar 5, taken along line A-A of FIG. 1. FIG. 4A illustrates a state before the airbag 101 is deployed. FIG. 4B illustrates a state after the airbag 101 is deployed.

As illustrated in FIG. 4A, the front pillar 5 has a closed cross-section formed by spot-welding a plurality of sheet metal parts. The front pillar 5 includes a pillar flange 5a formed by spot-welding a plurality of sheet metal parts and configured to fix the front window 10 and so forth with adhesive 31. The pillar flange 5a functions as "partition."

A flange hole 7a which is an opening formed into a vertically long slit is formed in the pillar flange 5a. The flange hole 7a functions as "partition hole."

A water guide 32 is provided in a gap between the front window 10 and the front pillar 5 in front of the pillar flange 5a to shut out dust and rain water. The water guide 32 functions as "cap". A concave part 32a is formed in the surface of the water guide 32 facing the flange hole 7a, and the water guide 32 includes a tether 32b made of synthetic fiber surrounded by the front window 10, the front pillar 5 and the adhesive 31.

In addition, the pillar trim 30 having an arc cross-section is mounted to the front pillar 5 and the pillar flange 5a to cover the front pillar 5 and the pillar flange 5a inside the vehicle compartment. A closed space enclosed by the front pillar 5, the pillar flange 5a and the pillar trim 30, that is, an inner space K of the pillar trim 30 forms "storage" inside the front pillar 5 in the vehicle compartment.

The airbag device E includes a flexible airbag 101, and an inflator 102 configured to supply expansion gas to expand the airbag 101. The airbag device E is stored in the inner space K of the pillar trim 30.

Here, the inflator 102 is stored in the inner space K of the pillar trim 30, but this is by no means limiting. The inflator 102 may be disposed in the inner space of an instrument panel or the door trim 40 as long as it is disposed in the space in the vehicle compartment. The same applies to subsequent Embodiments.

A gas tube 103 configured to supply the expansion gas from the inflator 102 to the airbag 101 is provided in the airbag 101. The gas tube 103 includes an injection port 103a configured to inject the expansion gas and disposed facing the outside of the vehicle compartment.

The airbag 101 includes a leading end portion 101a disposed in front of the flange hole 7a and main body 101b disposed behind the flange hole 7a.

To be more specific, the leading end portion 101a of the airbag 101 is disposed in the concave portion 32 of the water guide 32, in front of the flange hole 7a.

Like the leading end portion 101a of the airbag 101, the injection port 103a of the gas tube 103 is also disposed in the concave portion 32a of the water guide 32, in front of the flange hole 7a. That is, the leading end portion 101a of the airbag 101 and the injection port 103a of the gas tube 103 are disposed in the concave portion 32a of the water guide 32, in front of the flange hole 7a.

Here, with Embodiment 1, the concave portion 32a is formed in the water guide 32, but this is by no means limiting. The leading end portion 101a of the airbag 101 and the injection port 103a of the gas tube 103 may be disposed in the flange hole 5a without forming the concave portion 32a in the water guide 32. Alternatively, the leading end portion 101a of the airbag 101 and the injection port 103a of the gas tube 103 may be disposed in space in front of the flange hole 7a without forming the concave portion 32 in the water guide 32, as long as there is any space between the water guide 32 and the flange hole 7a. The same applies to subsequent Embodiments.

The main body 101b of the airbag 101 is folded up into concertinas, and stored in the inner space K of the pillar trim 30. Here, with Embodiment 1, the main body 101b of the airbag 101 is folded up into concertinas, but this is by no means limiting. The main body 101b of the airbag 101 may be rolled and folded for storage.

As illustrated in FIG. 4B, when the inflator 102 is actuated, the expansion gas is injected from the injection port 103a of the gas tube 103 toward the outside of the vehicle compartment, and the leading end portion 101a of the airbag 101 pushes out the water guide 32. The water guide 32 pushed out falls inward in the vehicle width direction, and then, the fallen water guide 32 is held by the tether 32b, while lying on its side.

Then, the main body 101b of the airbag 101 stored in the inner space K of the pillar trim 30 is dragged out of the flange hole 7a by the wind pressure from the injection port 103a, and deploys in front of the front pillar 5 to cover the front of the front pillar 5. Here, the water guide 32 lying on its side restricts the deployment of the main body 101b of the airbag 101 such that the main body 101b does not deploy inward in the vehicle width direction but deploys in front of the front pillar 5.

Figure 5A:
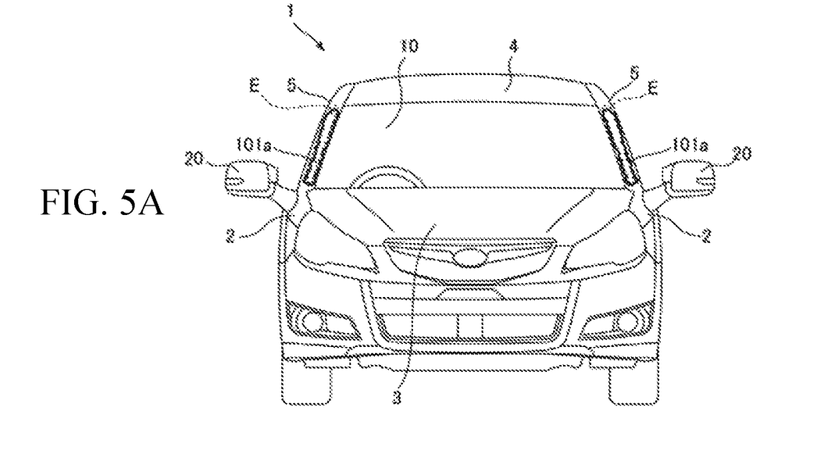
FIGS. 5A-5B are front views illustrating the airbags covering the front pillars according to Embodiment 1.
Figure 5B:
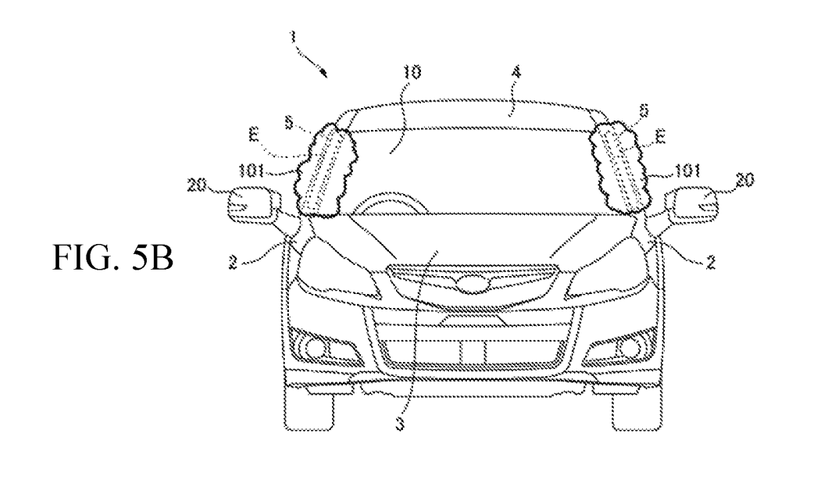

FIGS. 5A-5B are front views illustrating the airbags 101 covering the front pillars 5.

When the inflator 102 is actuated, the leading end portion 101a of the airbag 101 pushes out the water guide 32 and emerges in front of the front pillar 5 as illustrated in FIG. 5A.

Next, the main body 101b of the airbag 101 stored in the inner space K of the pillar trim 30 emerges in front of the front pillar 5 from the flange hole 7a of the pillar flange 5a to cover the front of the front pillar 5, as illustrated in FIG. 5B.

In this way, the airbag device E according to Embodiment 1 is stored in the inner space K of the pillar trim 30 inside the vehicle compartment, and therefore it is possible to provide a storage space larger than ever before, and therefore to increase the space to store the airbag 101 and expand the cover range of the airbag 101.

In addition, the airbag E according to Embodiment 1 is configured to cover the front of the front pillar 5. Here, the airbag 101 deploys from the pillar trim 30 inside (behind) the front pillar 5 in the vehicle compartment, and therefore the distance to the front of the front pillar 5 is short. Consequently, it is possible to shorten the period of time until the airbag 101 covers the front of the front pillar 5.

Moreover, in the airbag device E according to Embodiment 1, the airbag 101 deploys from the pillar trim 30 inside (behind) the front pillar 5 in the vehicle compartment, and therefore it is possible to deploy toward the front of the front pillar 5 in a simple and stable manner.

Here, with Embodiment 1, the flange hole 7a is formed into a vertically long slit, but this is by no means limiting. The flange hole 7a may be formed into a circle. If the flange hole 7a is formed into a circle, the airbag 101 can emerge in front of the front pillar 5 from the circular flange hole 7a. The same applies to subsequent Embodiments.

Embodiment 2

With Embodiment 1 described above, the main body 101b of the airbag 101 stored in the inner space K of the pillar trim 30 emerges in front of the front pillar 5 from the flange hole 7a. However, this is by no means limiting, and another configuration is possible where a pillar side wall hole is formed in the side wall of the front pillar 5 instead of the flange hole 7a formed in the pillar flange 5a, and the main body 101b of the airbag 101 emerges in front of the front pillar 5 from this pillar side wall hole.

With Embodiment 2, a pillar side wall hole 7b is formed in the side wall of the front pillar 5 as "partition", and the leading end portion 101a of the airbag 101 and the injection port 103a of the gas tube 103 are disposed in the pillar side wall hole 7b. Hereinafter, Embodiment 2 of the disclosure will be described with reference to FIGS. 6A-6B. Here, the same components as those in Embodiment 1 are given the same reference numerals, and the description is omitted.

Figure 6A:
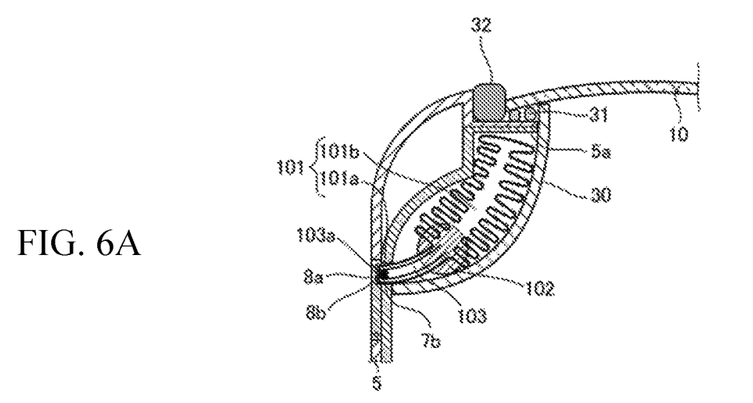
FIGS. 6A-6B are cross-sectional views schematically illustrating the front pillar according to Embodiment 2, taken along line A-A of FIG. 1.
Figure 6B:
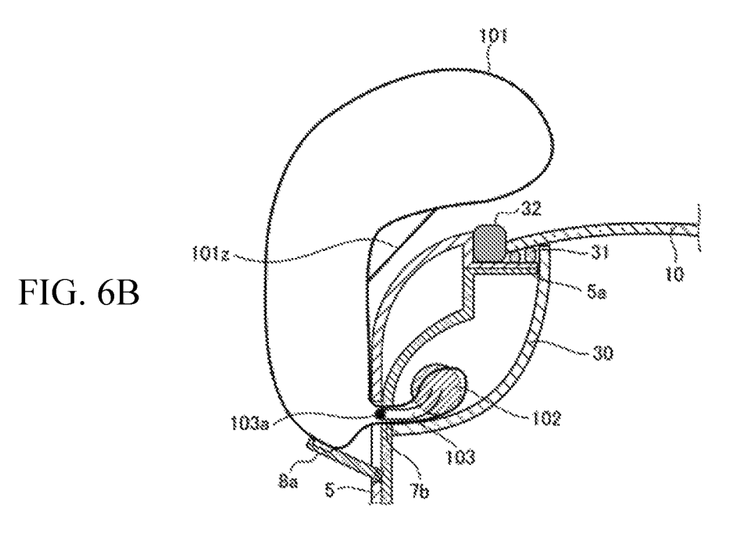

FIGS. 6A-6B are cross-sectional views schematically illustrating the front pillar 5 according to Embodiment 2, taken along line A-A of FIG. 1. FIG. 6A illustrates a state before the airbag 101 is deployed, and FIG. 6B illustrates a state after the airbag 101 is deployed.

As illustrated in FIG. 6A, the pillar side wall hole 7b is formed in the side wall of the front pillar 5, and a pillar cover 8a is mounted to the front pillar 5. The pillar cover 8a functions as "cap" to prevent dust and rain water from entering from the pillar side wall hole 7b.

The pillar cover 8a is made of synthetic resin or a sheet metal part with rigidity, and includes a concave portion 8b formed in the surface facing the pillar side wall hole 7b.

The injection port 103a of the gas tube 103 and the leading end portion 101a of the airbag 101 are disposed in the pillar side wall hole 7b and the concave portion 8b.

With Embodiment 2, the concave portion 8b is not necessarily formed in the pillar cover 8a, as long as the leading end portion 101a of the airbag 101 and the injection port 103a of the gas tube 103 are disposed at least in the pillar side wall hole 7b. The same applies to subsequent Embodiments.

When the inflator 102 is actuated, the expansion gas is injected from the injection port 103a of the gas tube 103 toward the outside of the vehicle compartment, and the leading end portion 101a of the airbag 101 pushes down the pillar cover 8a, as illustrated in FIG. 6B.

Here, the pillar cover 8a is pivotally supported on the back part of the front pillar 5, and when the leading end portion 101a of the airbag 101 pushes down the pillar cover 8a, an opening is formed at least in front of the front pillar 5, and the fallen pillar cover 8a is held by a predetermined stopper, while lying on its side.

Then, the main body 101b of the airbag 101 stored in the inner space K of the pillar trim 30 is dragged out of the pillar side wall hole 7b by the wind pressure from the injection port 103a, and emerges on the side of the front pillar 5 from the pillar side wall hole 7b, and contacts the pillar cover 8a, so that the main body 101b of the airbag 101 is deployed in front of the front pillar 5.

With Embodiment 2, the main body 101b of the airbag 101 includes a tether 101z which functions as "guide" to cause the main body 101b to deploy inward in the vehicle width direction. By this means, the main body 101b of the airbag 101 is deployed in front of the front pillar 5 to cover the front of the front pillar 5. Here, the main body 101b of the airbag 101 contacts the pillar cover 8a, and therefore can deploy to cover the front of the front pillar 5 in a stable manner.

In this way, with Embodiment 2, the injection port 103a of the gas tube 103 and the leading end portion 101a of the airbag 101 are disposed in the pillar side wall hole 7b, and it is possible to produce the same effect as that of Embodiment 1 described above.

Embodiment 3

With Embodiment 2 as described above, the main body 101b of the airbag 101 stored in the inner space K of the pillar trim 30 is deployed in front of the front pillar 5 from the pillar side wall hole 7b formed in the side surface of the front pillar 5. However, this is by no means limiting. Another configuration is possible where a pillar front hole is formed in the front of the front pillar 5, and the main body 101b of the airbag 101 emerges in front of the front pillar 5 from the pillar front hole.

With Embodiment 3, a pillar front hole 7c is formed in the front of the front pillar 5, and the leading end portion 101a of the airbag 101 and the injection port 103a of the gas tube 103 are disposed in the pillar front hole 7c. Hereinafter, Embodiment 3 of the disclosure will be described with reference to FIGS. 7A-7B. Here, the same components as those in Embodiments 1 and 2 are given the same reference numerals, and the description is omitted.

Figure 7A:
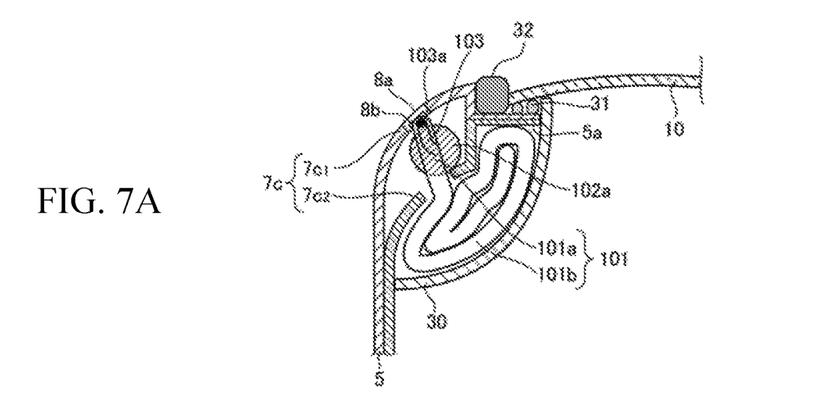
FIGS. 7A-7B are cross-sectional views schematically illustrating the front pillar according to Embodiment 3, taken along line A-A of FIG. 1.
Figure 7B:
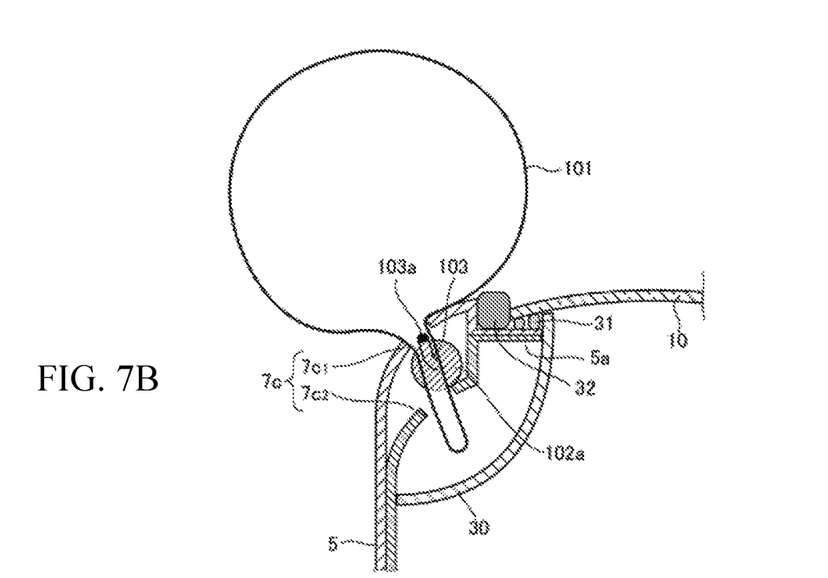

FIGS. 7A-7B are cross-sectional views schematically illustrating the front pillar 5 according to Embodiment 3, taken along line A-A of FIG. 1. FIG. 7A illustrates a state before the airbag 101 is deployed. FIG. 7B illustrates a state after the airbag 101 is deployed.

As illustrated in FIG. 7A, a first pillar front hole 7c1 is formed in an outer sheet metal part of the front of the front pillar 5; and a second pillar front hole 7c2 is formed in an inner sheet metal part of the front of the front pillar 5. Various members such as a reinforcement (not shown) are welded to the inside of the front pillar 5 between the outer sheet metal part and the inner sheet metal part.

In addition, the pillar cover 8a is mounted to the front pillar 5 to close the first pillar front hole 7c1 formed in the outer sheet metal part.

As illustrated in FIG. 7A, the main body 101b of the airbag 101 is rolled and folded for storage in the inner space K of the pillar trim 30. Here, with Embodiment 3, the main body 101b of the airbag 101 is rolled and folded for storage, but this is no means limiting. The main body 101b of the airbag 101 may be folded up into concertinas as illustrated in FIGS. 4A-4B and 6A-6B. The same applies to subsequent Embodiments.

The inflator 102a is disposed in the front pillar 5. The injection port 103a of the gas tube 103 and the leading end portion 101a of the airbag 101 are also disposed in the front pillar 5. That is, the leading end portion 101a of the airbag 101 and the injection port 103a of the gas tube 103 are disposed in the pillar front hole 7c.

Here, with Embodiment 3, the inflator 102a is disposed in the front pillar 5, but this is by no means limiting. Like Embodiments 1 and 2, the inflator 102a may be disposed in the inner space K of the pillar trim 30. Alternatively, the inflator 102a may be disposed in an instrument panel or the door trim 40 as long as it is disposed in space inside the vehicle compartment.

As illustrated in FIG. 7B, when the inflator 102a is activated, the expansion gas is injected from the injection port 103a of the gas tube 103 toward the outside of the vehicle compartment to cause the leading end portion 101a of the airbag 101 to blow off the pillar cover 8a, so that the leading end portion 101a emerges in front of the front pillar 5.

Then, the airbag 101 stored in the inner space K of the pillar trim 30 is dragged out of the pillar front hole 7c by the wind pressure of the expansion gas injected from the injection port 103a facing the outside of the vehicle compartment, and emerges and deploys in front of the front pillar 5 to cover the front of the front pillar 5.

In this way, with Embodiment 3, the injection port 103a of the gas tube 103 and the leading end portion 101a of the airbag 101 are disposed in the pillar front hole 7c, and it is possible to produce the same effect as that of Embodiment 1 described above.

Embodiment 4

With Embodiments 1 to 3 described above, the airbag 101 disposed in the inner space K of the pillar trim 30 can deploy only in front of the front pillar 5, but this is by no means limiting. The airbag 101 may deploy behind the front pillar 5, that is, deploy in the vehicle compartment.

With Embodiment 4, the airbag 101 can selectively deploy in front of the front pillar 5 and behind the front pillar 5. Hereinafter, Embodiment 4 of the disclosure will be described with reference to FIGS. 8A-8C. Here, the same components as those in Embodiments 1 to 3 are given the same reference numerals, and the description is omitted. Embodiment 4 is similar to Embodiment 1 illustrated in FIGS. 4A-4B, but different from Embodiment 1 in the gas tube 103.

Figure 8A:
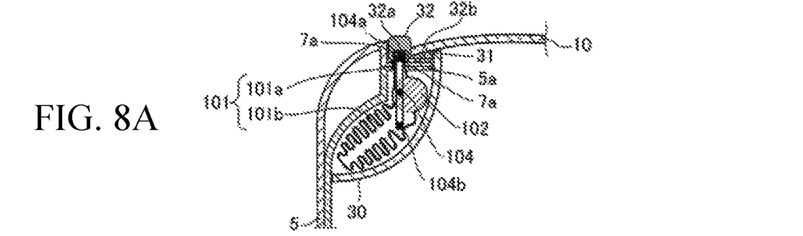
FIGS. 8A-8C are cross-sectional views schematically illustrating the front pillar according to Embodiment 4, taken along line A-A of FIG. 1.
Figure 8B:
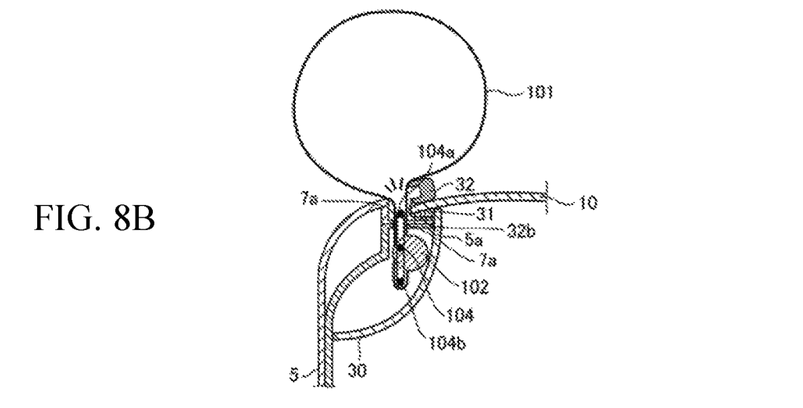
Figure 8C:
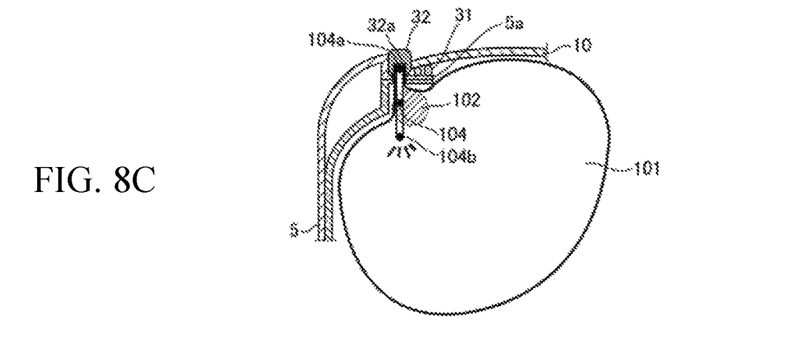

FIGS. 8A-8C are cross-sectional views schematically illustrating the front pillar 5 according to Embodiment 4, taken along line A-A of FIG. 1. FIG. 8A illustrates a state before the airbag 101 is deployed. FIG. 8B illustrates a state after the airbag 101 is deployed in front of the front pillar 5. FIG. 8C illustrates a state after the airbag 101 is deployed behind the front pillar 5.

As illustrated in FIG. 8A, the gas tube 104 for supplying the expansion gas from the inflator 102 to the airbag 101 includes a first injection port 104a configured to inject the expansion gas to the outside of the vehicle compartment, and a second injection port 104b configured to inject the expansion gas to the vehicle compartment. Each of the first injection port 104a and the second injection port 104b is formed by a one way nozzle configured to allow the expansion gas to be injected only in one direction.

An electromagnetic valve (not shown) is attached to the gas tube 104, and it is possible to select the first injection port 104a and the second injection port 104b to inject the expansion gas by using the electromagnetic valve.

The vehicle 1 is equipped with a collision detector configured to continuously detect the situation in front of the vehicle 1 to know a collision situation. The collision detector may be, for example, a camera for capturing images, and radar for transmitting and receiving ultrasonic waves or radio waves.

A controller of the airbag device E determines the collision situation of the vehicle 1, based on detection information obtained from the collision detector, and determines whether the vehicle 1 has collided with a person such as a pedestrian and a cyclist (first collision condition), or an object (second collision condition).

Then, when determining that the vehicle 1 has collided with a person, the controller of the airbag device E selects the first injection port 104 to inject the expansion gas by using the electromagnetic valve, and actuates the inflator 102.

By this means, the airbag 101 is deployed in front of the front pillar 5 as illustrated in FIG. 8B.

Meanwhile, when determining that the vehicle 1 has collided with an obstacle, the controller of the airbag device E selects the second injection port 104b to inject the expansion gas by using the electromagnetic valve, and activates the inflator 102. By this means, the airbag 101 is deployed behind the front pillar 5 as illustrated in FIG. 8C.

Here, with Embodiment 4, the first injection port 104a or the second injection port 104b is selected by using the electromagnetic valve, but this is by no means limiting. Another configuration is possible where two inflators 102 are provided instead of the electromagnetic valve, and each of the inflators 102 includes an injection port of the gas tube 104; and the controller of the airbag device E selects one of the inflators 102 to be actuated, depending on the collision situation.

Figure 9A:
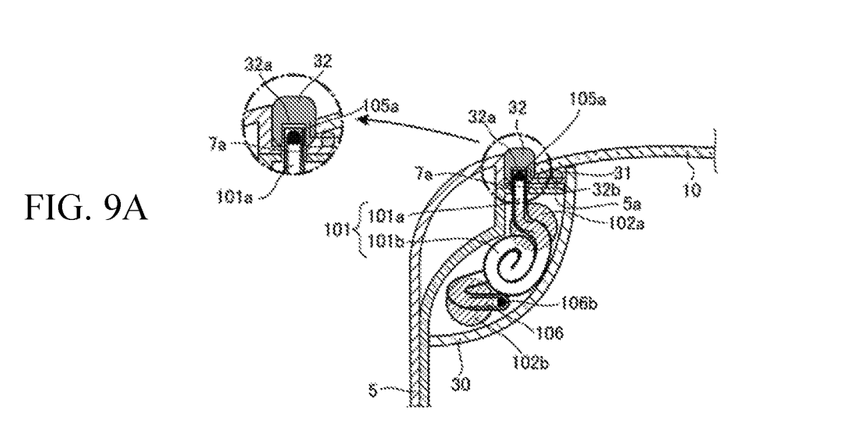
FIGS. 9A-9B are cross-sectional views schematically illustrating the front pillar according to Embodiment 5, taken along line A-A of FIG. 1.

For example, referring to FIG. 9A for the different embodiment, when determining that the vehicle 1 has collided with a person, the controller of the airbag device E may actuate the first inflator 102a coupled to the first injection port 105a, and, on the other hand, when determining that the vehicle 1 has collided with an obstacle, the controller may actuate the second inflator 102b coupled to the second injection port 106b.

In this way, with Embodiment 4, it is possible not only to produce the same effect as that of Embodiment 1 described above, but also to protect a passenger in the vehicle 1. Moreover, it is possible to protect a person such as a pedestrian or a cyclist, and also protect a passenger in the vehicle 1 by the same airbag, and therefore to reduce the space to store the airbags 101.

Embodiment 5

With Embodiment 4 described above, the airbag 101 disposed in the inner space K of the pillar trim 30 can be deployed selectively, in front of, and behind the front pillar 4, but this is by no means limiting. The airbag 101 may be deployed in front of and behind the front pillar 5 at the same time.

With Embodiment 5, the airbag 101 can be deployed in front of and behind the front pillar 5 at the same time. Hereinafter, Embodiment 5 of the disclosure will be described with reference to FIGS. 9A-9B. Here, the same components as those in Embodiments 1 to 4 are given the same reference numerals, and the description is omitted.

Figure 9B:
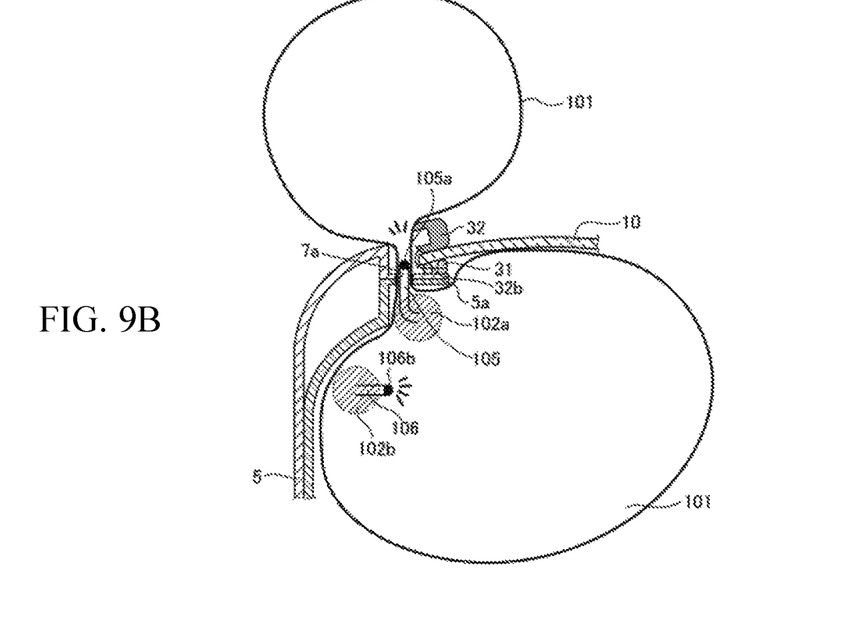

FIGS. 9A-9B are cross-sectional views schematically illustrating the front pillar 5 according to Embodiment 5, taken along line A-A of FIG. 1. FIG. 9A illustrates a state before the airbag 101 is deployed. FIG. 9B illustrates a state after the airbag 101 is deployed.

As illustrated in FIG. 9A, two inflators, the first inflator 102a and the second inflator 102b are disposed in the inner space K of the pillar trim 30.

A first gas tube 105 is coupled to the first inflator 102a, and provided with the first injection port 105a configured to inject the expansion gas to the outside of the vehicle compartment.

Meanwhile, a second gas tube 106 is coupled to the second inflator 102b, and provided with the second injection port 106b configured to inject the expansion gas to the vehicle compartment.

When determining that a collision of the vehicle 1 occurs, the controller of the airbag device E actuates the first inflator 102a and the second inflator 102b to deploy the airbag 101 in front of and behind the front pillar 5, respectively. By this means, the airbag 101 can be deployed in front of and behind the front pillar 5 at the same time as illustrated in FIG. 9B.

In this way, with Embodiment 5, it is possible not only to produce the same effect as that of Embodiment 1 described above, but also to protect a person such as a pedestrian or a cyclist and protect a passenger in the vehicle 1 at the same time.

As described above, the airbag device E according to the disclosure can deploy the airbag 101 for the front pillar 5 in a stable manner, while increasing the volume of the airbag 101 and expanding the cover range of the airbag 101.

The invention claimed is:

1. An airbag device comprising:
   an airbag configured to deploy in front of a front pillar of a vehicle;
   an inflator configured to supply expansion gas to expand the airbag; and
   a gas tube disposed in the airbag and configured to supply the expansion gas from the inflator,
   the front pillar comprising:
      a storage formed inside the front pillar in a vehicle compartment and configured to store at least the airbag; and
      a partition configured to separate between an inside and an outside of the vehicle compartment, a partition hole being open in the partition, wherein:
   before the expansion gas is supplied from the inflator, part of the airbag and an injection port configured to inject the expansion gas from the gas tube are disposed in front of or in the partition hole, and the injection port is disposed facing the outside of the vehicle compartment; and
   when the expansion gas is supplied from the inflator, the airbag disposed in the vehicle compartment moves outside the vehicle compartment via the partition hole, and deploys and expands in front of the front pillar.

2. The airbag device according to claim 1, wherein:
   the airbag comprises:
      a main body disposed in the storage behind the partition hole; and
      a leading end portion disposed in front of, or in the partition hole, and
      a cap is provided in front of the partition hole and the leading end portion of the airbag to shut out dust and rain water.

3. The airbag device according to claim 2, wherein a concave portion is formed in a surface of the cap facing the partition to dispose at least the leading end portion of the airbag.

4. The airbag apparatus according to claim 3, wherein:
   when the expansion gas is supplied by the inflator, the cap is pushed out of a front of the partition hole by expansion force of the airbag, falls sideway, and keeps lying on a side of the cap; and
   the cap lying on the side restricts deployment of the airbag to deploy in front of the front pillar.

5. The airbag device according to claim 4, wherein:
   the storage is a pillar trim configured to cover the front pillar inside the vehicle compartment;
   the partition is a pillar flange configured to bond a windshield of the vehicle to the front pillar; and
   the cap is a water guide disposed in a gap between the windshield and the front pillar.

6. The airbag device according to claim 4, wherein:
   the partition is a side wall of the front pillar; and
   the airbag comprises a guide configured to cause the airbag emerging from the side wall of the front pillar to turn inward in the vehicle width direction to deploy in front of the front pillar.

7. The airbag device according to claim 4, wherein the airbag covers a front of the front pillar when a first collision condition is established, and covers a back of the front pillar when a second collision condition is established.

8. The airbag device according to claim 3, wherein:
   the storage is a pillar trim configured to cover the front pillar inside the vehicle compartment;
   the partition is a pillar flange configured to bond a windshield of the vehicle to the front pillar; and
   the cap is a water guide disposed in a gap between the windshield and the front pillar.

9. The airbag device according to claim 3, wherein:
   the partition is a side wall of the front pillar; and the airbag comprises a guide configured to cause the airbag emerging from the side wall of the front pillar to turn inward in the vehicle width direction to deploy in front of the front pillar.

10. The airbag device according to claim 3, wherein the airbag covers a front of the front pillar when a first collision condition is established, and covers a back of the front pillar when a second collision condition is established.

11. The airbag apparatus according to claim 2, wherein:
when the expansion gas is supplied by the inflator, the cap is pushed out of a front of the partition hole by expansion force of the airbag, falls sideway, and keeps lying on a side of the cap; and
the cap lying on the side restricts deployment of the airbag to deploy in front of the front pillar.

12. The airbag device according to claim 4, wherein:
the storage is a pillar trim configured to cover the front pillar inside the vehicle compartment;
the partition is a pillar flange configured to bond a windshield of the vehicle to the front pillar; and
the cap is a water guide disposed in a gap between the windshield and the front pillar.

13. The airbag device according to claim 11, wherein:
the partition is a side wall of the front pillar; and
the airbag comprises a guide configured to cause the airbag emerging from the side wall of the front pillar to turn inward in the vehicle width direction to deploy in front of the front pillar.

14. The airbag device according to claim 11, wherein the airbag covers a front of the front pillar when a first collision condition is established, and covers a back of the front pillar when a second collision condition is established.

15. The airbag device according to claim 2, wherein:
the storage is a pillar trim configured to cover the front pillar inside the vehicle compartment;
the partition is a pillar flange configured to bond a windshield of the vehicle to the front pillar; and
the cap is a water guide disposed in a gap between the windshield and the front pillar.

16. The airbag device according to claim 2, wherein:
the partition is a side wall of the front pillar; and
the airbag comprises a guide configured to cause the airbag emerging from the side wall of the front pillar to turn inward in the vehicle width direction to deploy in front of the front pillar.

17. The airbag device according to claim 2, wherein the airbag covers a front of the front pillar when a first collision condition is established, and covers a back of the front pillar when a second collision condition is established.

18. The airbag device according to claim 1, wherein:
the partition is a side wail of the front pillar; and
the airbag comprises a guide configured to cause the airbag emerging from the side wall of the front pillar to turn inward in the vehicle width direction to deploy in front of the front pillar.

19. The airbag device according to claim 1, wherein the airbag covers a front of the front pillar when a first collision condition is established, and covers a back of the front pillar when a second collision condition is established.

* * * * *